United States Patent
Murata

(10) Patent No.: US 10,335,950 B2
(45) Date of Patent: Jul. 2, 2019

(54) ROBOT CONTROL APPARATUS AND ROBOT CONTROL METHOD

(71) Applicant: FANUC CORPORATION, Yamanashi (JP)

(72) Inventor: Yuusuke Murata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 262 days.

(21) Appl. No.: 15/602,980

(22) Filed: May 23, 2017

(65) Prior Publication Data

US 2017/0341234 A1 Nov. 30, 2017

(30) Foreign Application Priority Data

May 31, 2016 (JP) ................. 2016-109064
Jan. 20, 2017 (JP) ................. 2017-008564

(51) Int. Cl.
*B25J 9/16* (2006.01)

(52) U.S. Cl.
CPC ... *B25J 9/1692* (2013.01); *G05B 2219/39029* (2013.01)

(58) Field of Classification Search
CPC ...... B25J 9/1676; B25J 9/1692; B25J 19/023; Y10S 901/02; Y10S 901/49; Y10S 901/46; G01B 11/026; G01B 11/14; G05B 2219/37555; G05B 2219/39029; G05B 2219/35308; G05B 2219/40311
USPC ..... 700/254, 28, 31, 32, 245, 250, 251, 170, 700/56, 255; 369/43, 44.27; 901/2, 8, 46
See application file for complete search history.

(56) References Cited

U.S. PATENT DOCUMENTS

| | | | |
|---|---|---|---|
| 2008/0004750 A1 | 1/2008 | Ban et al. | |
| 2009/0076655 A1 | 3/2009 | Blondel et al. | |
| 2013/0066616 A1* | 3/2013 | Shimakawa | G05B 19/4068 703/7 |
| 2013/0116828 A1* | 5/2013 | Krause | B25J 9/1605 700/264 |

(Continued)

FOREIGN PATENT DOCUMENTS

| | | |
|---|---|---|
| JP | S59-003505 | 1/1984 |
| JP | S62049513 | 3/1987 |

(Continued)

OTHER PUBLICATIONS

Decision to Grant a Patent dated Nov. 20, 2018, for Japanese Patent Application No. 2017-008564.

(Continued)

*Primary Examiner* — Dalena Tran
(74) *Attorney, Agent, or Firm* — Karceski IP Law, PLLC

(57) ABSTRACT

A robot control apparatus includes a storage unit that stores an operating program and a kinematic parameter used in a formula representing a relationship between displacement of each drive axis of a robot and a position and an orientation of a leading end of the robot and a drive unit that operates the drive axis of the robot based on the operating program and the kinematic parameter stored in the storage unit. The storage unit stores the kinematic parameter before updating, and the drive unit corrects position data of at least one teaching point in the operating program based on the kinematic parameter before updating, stored in the storage unit, and the present kinematic parameter.

7 Claims, 5 Drawing Sheets

(56) References Cited

U.S. PATENT DOCUMENTS

2013/0255426 A1* 10/2013 Kassow ............... B25J 19/0004
                                                                           74/490.03
2014/0236565 A1* 8/2014 Kuwahara ............. B25J 9/1671
                                                                              703/22

FOREIGN PATENT DOCUMENTS

| JP | S63193203 A   | 8/1988  |
|----|---------------|---------|
| JP | H05-134738    | 6/1993  |
| JP | H09044227 A   | 2/1997  |
| JP | H10080883     | 3/1998  |
| JP | 2001038662 A  | 2/2001  |
| JP | 2001-105357   | 4/2001  |
| JP | 2008-012604   | 1/2008  |
| JP | 2009148850    | 7/2009  |
| JP | 2012192498 A  | 10/2012 |
| JP | 2016013608    | 1/2016  |

OTHER PUBLICATIONS

Search Report by Registered Searching Organization dated May 10, 2018, for Japanese Patent Application No. 2017-008564.
Japanese Office Action dated May 15, 2018, for Japanese Patent Application No. 2017-008564.

* cited by examiner

ROBOT CONTROL APPARATUS AND ROBOT CONTROL METHOD

CROSS-REFERENCE TO RELATED APPLICATIONS

This application is based on and claims priority to both Japanese Patent Application No. 2016-109064, filed May 31, 2016, and Japanese Patent Application No. 2017-008564, filed Jan. 20, 2017, the entire contents of both of which are incorporated herein by reference.

Field of the Invention

The present invention relates to a robot control apparatus and a robot control method.

Background of the Invention

In order to improve the positioning accuracy of a robot, kinematic parameters of the robot, used in robotic control, are calibrated, as known in related art (for example, refer to Japanese Unexamined Patent Application, Publication No. 2008-012604 ("JP '604")).

The kinematic parameters are parameters used in a formula that defines the relationship between the displacement of each drive axis and the position and orientation of a leading end of the robot.

JP '604 discloses a kinematic parameter correcting method including automatically measuring the relationship between a leading end position of a robot and the displacement of a controllable drive axis by using a light-receiving device that identifies a target and determining errors in the kinematic parameters.

SUMMARY OF THE INVENTION

An aspect of the present invention provides a robot control apparatus that includes a storage unit that stores an operating program and a kinematic parameter used in a formula representing a relationship between displacement of each drive axis of a robot and a position and an orientation of a leading end of the robot; and a drive unit that operates the drive axis of the robot based on the operating program and the kinematic parameter stored in the storage unit. In order for the leading end of the robot to assume a position and an orientation at the time of teaching even when the kinematic parameter has been updated after teaching of the operating program and when the drive axis is operated by executing the operating program using the present kinematic parameter, the storage unit stores the kinematic parameter before updating, and the drive unit corrects position data of at least one teaching point in the operating program based on the kinematic parameter before updating stored in the storage unit and the present kinematic parameter.

Another aspect of the present invention provides a robot control method with which, when a kinematic parameter used in a formula representing a relationship between displacement of each drive axis of a robot and a position and an orientation of a leading end of the robot is updated after teaching of an operating program, the position and orientation of the leading end of the robot at the time of teaching are still realized by executing the operating program using the present kinematic parameter to operate the drive axis, the method including a step of storing the kinematic parameter before updating and a step of correcting position data of at least one teaching point in the operating program based on the kinematic parameter before updating stored in the storage unit and the present kinematic parameter.

DESCRIPTION OF EMBODIMENT(S)

A robot control apparatus 1 according to one embodiment of the present invention will now be described with reference to the drawings.

Figure 1:
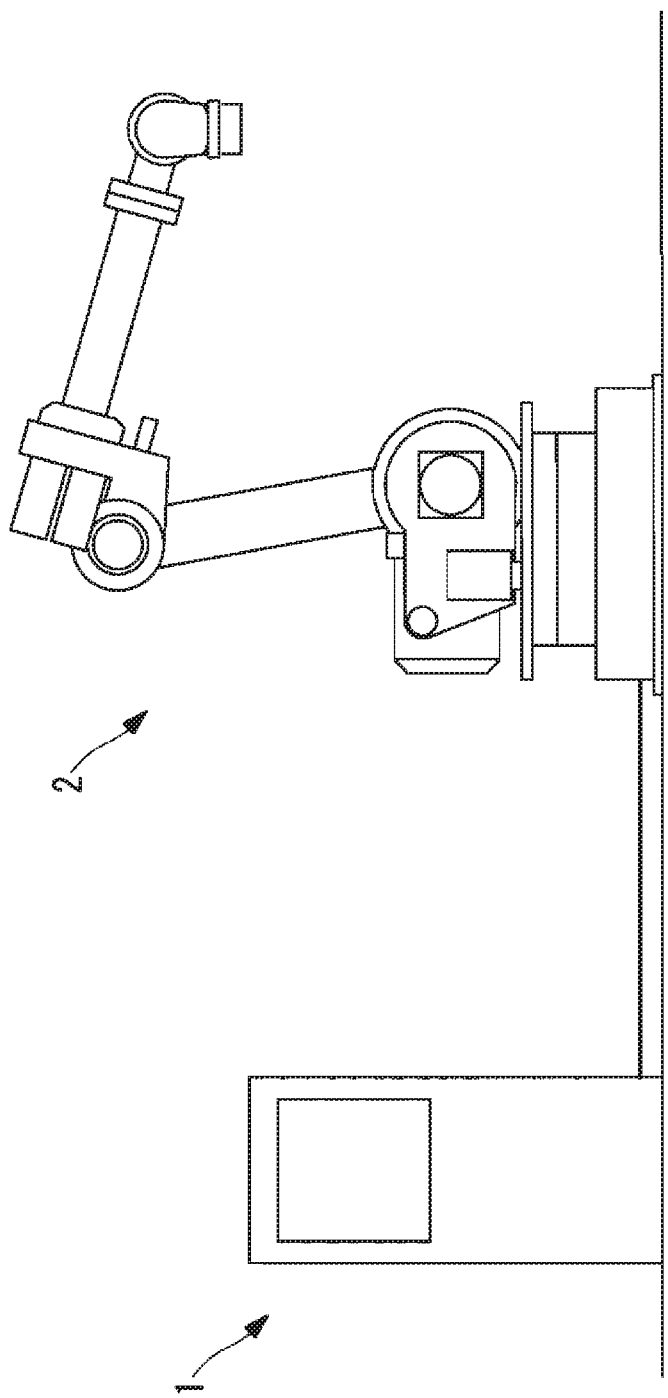
FIG. 1 is an overall view of a robot control apparatus according to one embodiment of the present invention.
Figure 2:
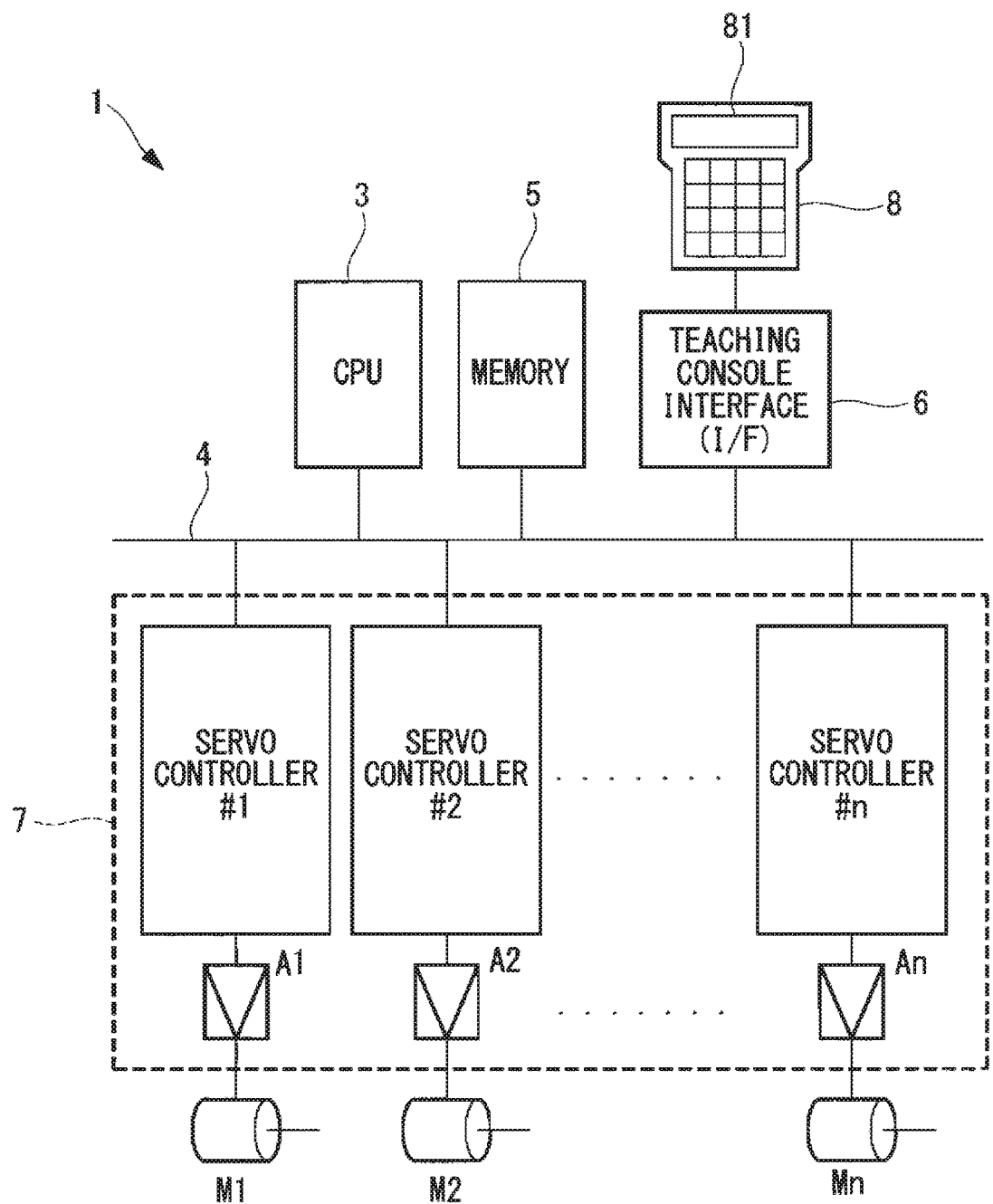
FIG. 2 is a block diagram illustrating the robot control apparatus illustrated in FIG. 1.

The robot control apparatus 1 according to this embodiment is, for example, connected to an articulated robot 2, as illustrated in FIG. 1, and includes a memory (storage unit) 5 connected in parallel to a bus 4 connected to a CPU 3, a teaching console interface (I/F) 6, and a servo control unit (drive unit) 7, as illustrated in FIG. 2.

The teaching console interface 6 is connected to a teaching console 8. The teaching console 8 is equipped with a display unit 81 and has a display function. The operator manually operates the teaching console 8 to generate, correct, or register the operating program of the robot 2, set various parameters, playback the taught operating program, or execute jog feed, for example.

A system program that supports basic functions of the robot 2 and the robot control apparatus 1 is stored in a ROM (not shown in the drawing) in the memory 5. The operating program taught to the robot according to the application and the relevant settings data are stored in a non-volatile memory (not shown in the drawing) in the memory 5. Programs for various processes (processes for moving the robot related to determining the kinematic parameters etc.) and data such as kinematic parameters are also stored in a non-volatile memory (not shown in the drawing) in the memory 5.

A RAM, not shown in the drawing, in the memory 5 is used as a storage area for temporarily storing data used in various numerical processes carried out in the CPU 3. The servo control unit 7 is equipped with servo controllers #1 to #n (n is the total number of axes of the robot 2 and is 6 in this case) and is configured to output, in response to move commands generated by arithmetic processing (generation of a trajectory plan, interpolation based on the trajectory plan, reverse conversion, etc.) for robotic control, torque commands to servo amplifiers A1 to An along with the feedback signals sent from a pulse coder or encoder (not shown) attached to each axis. The servo amplifiers A1 to An respectively supply electric currents to servomotors M1 to Mn of the respective axes according to the torque commands so as to drive the servomotors M1 to Mn.

In this embodiment, when the operator manually operates the teaching console 8 to execute a calibration process, a calibration program stored in the memory 5 is run, and new kinematic parameters are calculated through a known calibration method.

Here, the kinematic parameters refer to parameters used in a formula that defines the relationship between the displacement (input) of each drive axis of the robot 2 and the leading end position (output) of the robot 2 used in robotic control. Representative examples of the parameters are the link length and the origin position of each drive axis. Other examples include the backlash that occurs depending on the rotation direction of the axis, the amount of elastic deformation of the link, and the amount of elastic deformation of a reducer. In the present invention, the types of the kinematic parameters identified and calculated are not particularly limited and may be any parameters that can be formulated and are independent from one another.

In this embodiment, kinematic parameters that are stored at the time the operator manually operates the teaching console 8 to teach and register a new operating program are stored in the memory. A specific robot control method is as follows.

Figure 3:
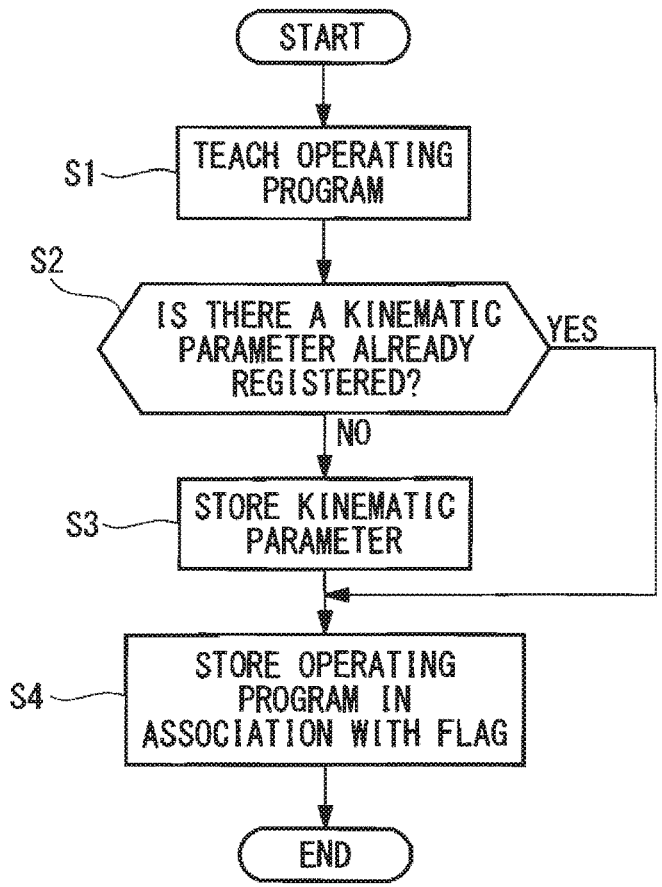
FIG. 3 is a flowchart describing a process performed by the robot control apparatus illustrated in FIG. 1, the process involving storing a kinematic parameter for each operating program.

First, as illustrated in FIG. 3, the operator teaches an operating program (step S1). Then, it is judged whether or not the same kinematic parameters as those at that teaching timepoint are stored (step S2). If NO, the kinematic parameters are stored (step S3), and each operating program is stored in association with a flag that indicates the associated kinematic parameters (step S4).

Figure 4:
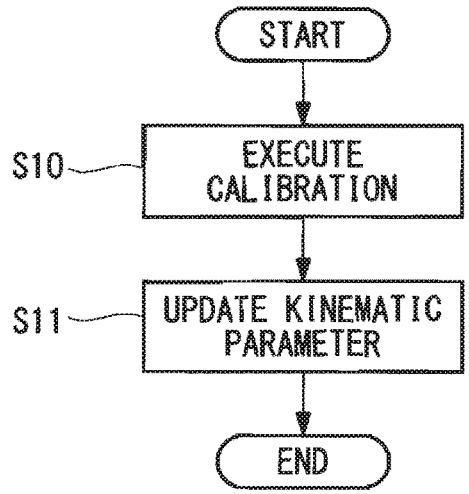
FIG. 4 is a flowchart describing a calibration process performed by the robot control apparatus illustrated in FIG. 1.

Then, as illustrated in FIG. 4, a calibration process is executed (step S10). As a result, new kinematic parameters are calculated, and the kinematic parameters stored in the memory 5 are updated to new kinematic parameters (step S11).

Figure 5:
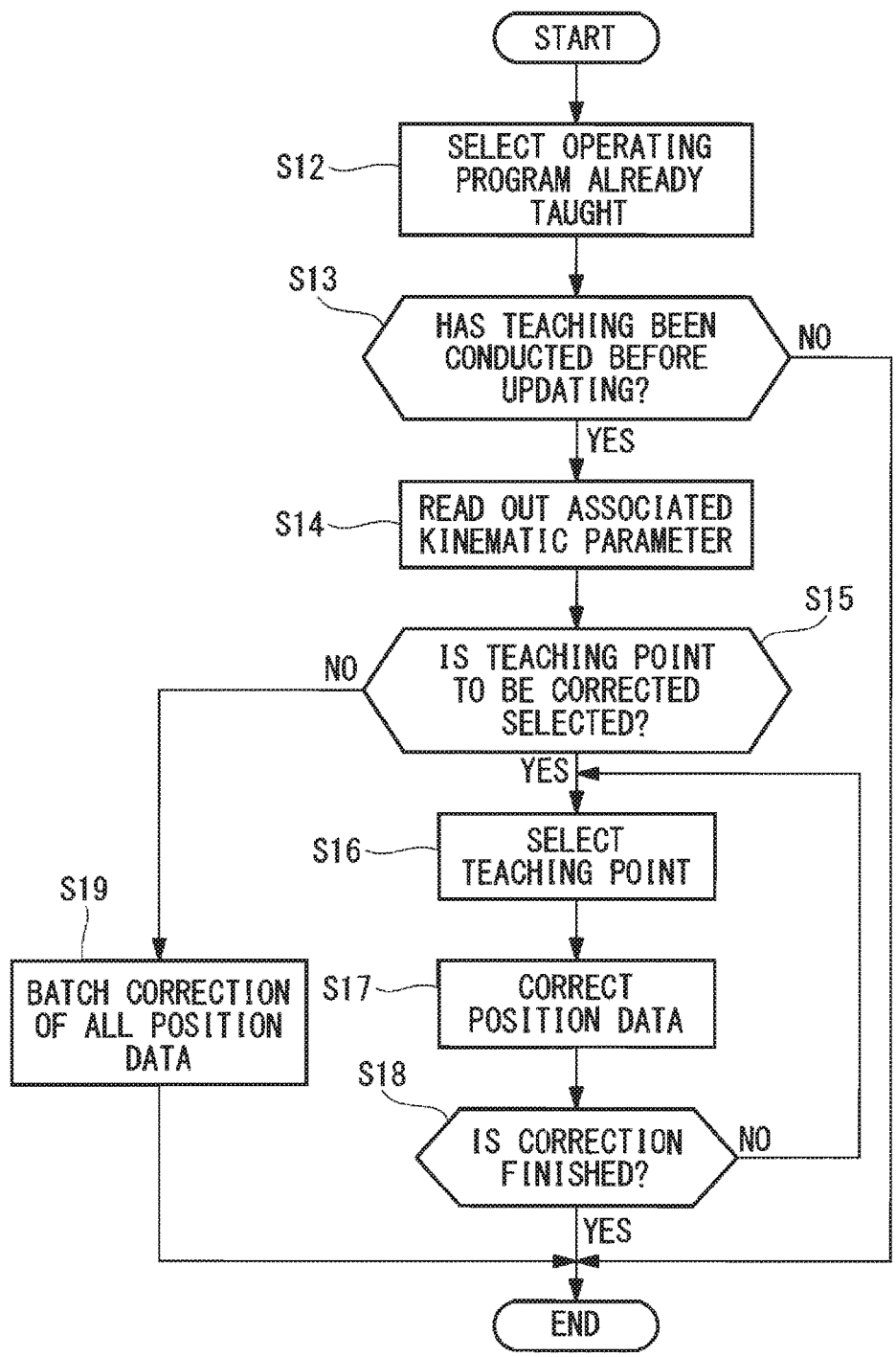
FIG. 5 is a flowchart describing a process performed by the robot control apparatus illustrated in FIG. 1, the process involving correcting position data for each operating program.

As illustrated in FIG. 5, when the operating program that has already been taught is selected by the operator through manual operation of the teaching console 8 after updating the new kinematic parameters (step S12), the flag stored in association with the selected operating program is judged (step S13) and, if a flag indicating the operating program that has been taught before updating is set, the kinematic parameters corresponding to the flag are read out from the memory 5 (step S14).

If the selected operating program is a program that has been taught before updating of the kinematic parameters, it is confirmed whether or not to select a teaching point to be corrected or not (step S15). If correction is to be performed for each teaching point, the teaching point to be corrected is selected (step S16). If correction is not to be performed for every teaching point, batch correction is conducted for all teaching points (step S19).

Upon completion of the selection of the teaching point to be corrected, a correction process is performed on the selected teaching point.

The correction process is carried out by correcting the position data of the teaching point so that the position and orientation of the leading end of the robot 2 at the teaching point to be realized by using the kinematic parameters before updating can also be realized by using the present kinematic parameters.

The example illustrated in FIG. 5 is an example in which the kinematic parameters are the positions of the origins of the respective drive axes. Here, the position of the origin of each drive axis is, for example, defined by the encoder count value of an absolute encoder.

When the position of the origin of each drive axis of the robot 2 is updated by calibration, the origin position at the teaching timepoint stored in the memory 5 is read out, the difference from the present origin position of each drive axis is calculated, and the calculated difference is added to or subtracted from the angular position of each drive axis corresponding to the position data of the selected teaching point in the operating program (step S17). If correction of the position data is unfinished (step S18), the steps from step S15 are repeated.

For example, when the origin position before updating is p1 and the origin position after updating is p2, $S=p2-p1$ is calculated, and the difference S is added to the angular position of the drive axis corresponding to the position data of the selected teaching point of the operating program taught before updating. When the teaching point is the origin position, the angular position of the drive axis corresponding to the teaching point after correction is $p1+S=p1+p2-p1=p2$.

In other words, when the angular position of each drive axis corresponding to the position data of the teaching point is corrected in this way, and the operating program taught before updating is executed by using a present kinematic parameter, i.e., a present origin point, the position and orientation of the leading end of the robot 2 at the corrected teaching point of the operating program can remain the same as the position and orientation before updating.

However, an accident, such as losing the encoder count value due to a voltage drop of a backup battery of an absolute encoder, replacement of the absolute encoder, or the like, may occur after teaching of the operating program and before calibration. If the position data of the teaching point is corrected on the basis of the kinematic parameter at the teaching timepoint, the right amount of correction can no longer be calculated due to the loss of the encoder count value. As a result, the position and orientation of the leading end of the robot 2 at the corrected teaching point significantly deviate from the position and orientation at the time of teaching.

Figure 7:
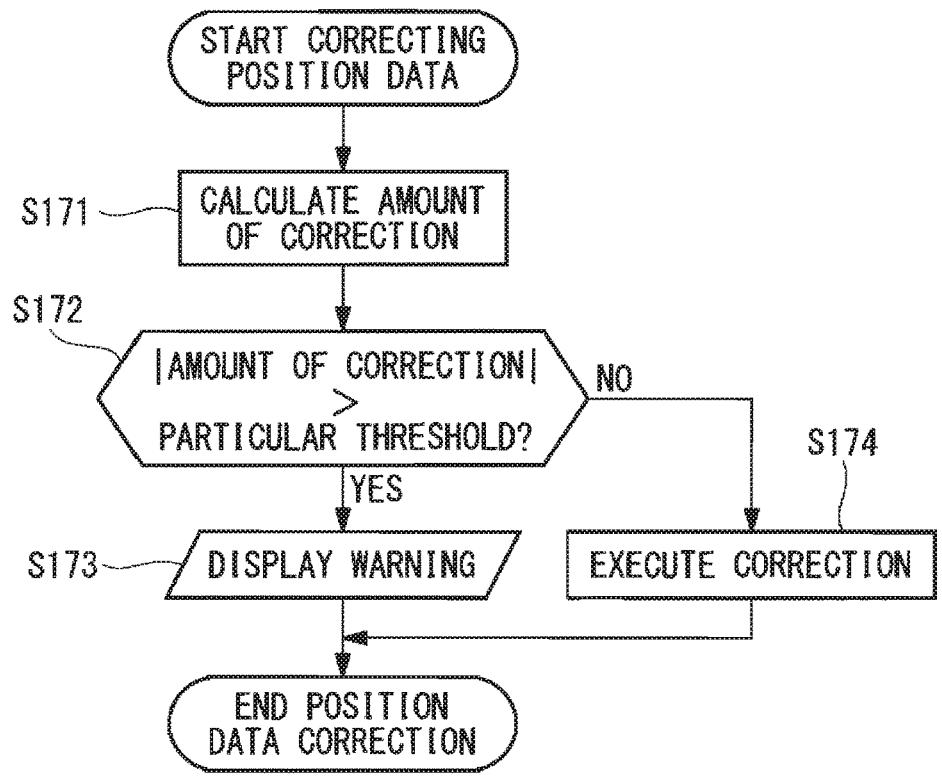
FIG. 7 is a flowchart describing a process of a step of correcting the position data included in the flowchart of FIG. 5.

To address this issue, as illustrated in FIG. 7, the following process is preferably conducted in step S17 of correcting the position data.

That is, the amount of correction is calculated on the basis of the kinematic parameter before updating and the present kinematic parameter (step S171), and then it is judged whether the absolute value of the calculated amount of correction exceeds a particular threshold (step S172). If the absolute value of the calculated amount of correction exceeds the particular threshold, a warning is displayed on the display unit 81 of the teaching console 8 (step S173). If the absolute value of the calculated amount of correction is equal to or smaller than the particular threshold, correction of the position data of the teaching point is executed on the basis of the calculated amount of correction (step S174). The particular threshold is determined in advance through experiments.

For example, if the origin position before updating is p1 and the origin position after update is p2, $S=p2-p1$ is calculated as the amount of correction. If the absolute value of the amount of correction is equal to or smaller than the particular threshold, the difference S is added to the angular position of each drive axis corresponding to the position data of the selected teaching point of the operating program taught before updating. If the encoder count value is not lost and the teaching point is the origin position, the angular position of the drive axis corresponding to the teaching point after correction is p1+S=p1+p2−p1=p2. If the absolute value of the amount of correction exceeds the particular threshold, the position data is not corrected, and a warning is displayed on the display unit 81.

In this manner, when the encoder count value of the absolute encoder is lost between teaching and calibration, unintended correction of the position data of the teaching point based on the kinematic parameters before updating can be prevented.

According to the robot control apparatus 1 and the robot control method of this embodiment, even when the kinematic parameters are updated, the operating program taught before updating can be used without having to perform a re-teaching operation. Thus, the time and workload required for the re-teaching operation by the operator can be reduced, which is an advantage.

In this embodiment, the kinematic parameters at the teaching timepoint are stored for each operating program when the operating program is generated. Alternatively, kinematic parameters at the teaching timepoint may be stored for each teaching point when the operating program is generated. In adding a teaching point, the kinematic parameter at that timepoint is stored, and when the teaching point is corrected, the stored kinematic parameter is updated using the kinematic parameter at that timepoint so as to cope with the case in which the kinematic parameter at the time of teaching differs from one teaching point to another. In other words, this is a case where the kinematic parameter generated when addition or correction of the teaching point is performed differs from the kinematic parameters generated during generation of the operating program. Even when the kinematic parameters are updated, the above-described advantageous effects can be achieved.

In this case also, in order to prevent storage of two or more of the same kinematic parameters, only the flag used to associate that kinematic parameter is associated and stored if the same kinematic parameter is already stored in the memory. As a result, the storage capacity can be reduced.

Figure 6:
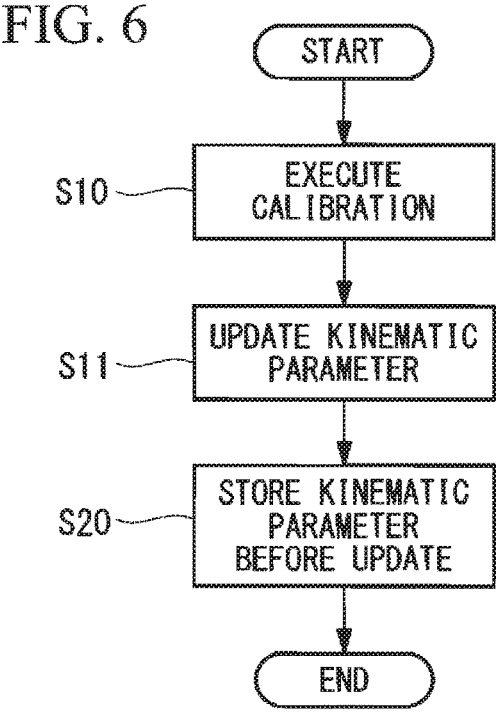
FIG. 6 is a flowchart describing a process performed by the robot control apparatus illustrated in FIG. 1, the process involving storing the kinematic parameter before updating each time calibration is conducted.

As illustrated in FIG. 6, the kinematic parameter before updating may be stored every time calibration is conducted (steps S11 and S20). In this case, the same advantageous effects can be achieved when the kinematic parameter at the time of teaching at the teaching point to be subjected to the position data correction process is selected by the operator from among the stored kinematic parameters.

As a result, the above-described embodiment leads to the following aspects.

An aspect of the present invention provides a robot control apparatus that includes a storage unit that stores an operating program and a kinematic parameter used in a formula representing a relationship between displacement of each drive axis of a robot and a position and an orientation of a leading end of the robot; and a drive unit that operates the drive axis of the robot based on the operating program and the kinematic parameter stored in the storage unit. In order for the leading end of the robot to assume a position and an orientation at the time of teaching even when the kinematic parameter has been updated after teaching of the operating program and when the drive axis is operated by executing the operating program using the present kinematic parameter, the storage unit stores the kinematic parameter before updating, and the drive unit corrects position data of at least one teaching point in the operating program based on the kinematic parameter before updating stored in the storage unit and the present kinematic parameter.

According to this embodiment in which the kinematic parameter before updating is stored in the storage unit, when the operating program taught before updating is executed after the kinematic parameter is updated as a result of execution of calibration, at least one position data of the operating program is corrected on the basis of the kinematic parameter before updating, stored in the storage unit, and the present kinematic parameter.

In other words, according to related art, once the kinematic parameter is updated, the operating program is executed by using the updated kinematic parameter from that time on. Thus, the position and orientation of the leading end of the robot at the time of teaching cannot be realized by merely executing the operating program taught before updating. According to this embodiment, the position data of the operating program is corrected by using the kinematic parameter before updating and the present kinematic parameter. In this manner, when the operating program taught before updating is executed by using the present kinematic parameter, the position and orientation of the leading end of the robot at the time of teaching can be realized. As a result, the operating program for which the teaching operation is carried out before execution of calibration can be re-used without having to perform a re-teaching operation.

In the aspect described above, the robot control apparatus may include a display unit and the drive unit may calculate an amount of correction based on the kinematic parameter before updating stored in the storage unit and the present kinematic parameter; and if the amount of correction has an absolute value equal to or smaller than a particular threshold, position data of at least one teaching point in the operating program may be corrected, and if the amount of correction has an absolute value exceeding the particular threshold, a warning may be displayed on the display unit.

According to this configuration, even if the encoder count value of the absolute encoder attached to each axis of the robot is lost for some reason after the teaching operation and before execution of calibration, unintended correction of the position data of the teaching point based on the kinematic parameter before updating can be prevented.

In the aspect described above, the drive unit may correct position data of at least one teaching point of the operating program taught before updating of the kinematic parameter, the position data being corrected by using a difference between an angle of the drive axis at which the same position and orientation of the leading end of the robot as those at the time of teaching are realized by using the kinematic parameter before updating and an angle of the drive axis at which the same position and orientation of the leading end of the robot as those at the time of teaching are realized by using the present kinematic parameter.

In the aspect of the described above, the drive unit may calculate, as the amount of correction at least one teaching point of the operating program taught before updating of the kinematic parameter, a difference between an angle of the drive axis at which the same position and orientation of the leading end of the robot as those at the time of teaching are realized by using the kinematic parameter before updating and an angle of the drive axis at which the same position and orientation of the leading end of the robot as those at the time of teaching are realized by using the present kinematic parameter; and if the amount of correction has an absolute value equal to or less than the particular threshold, position data of the at least one teaching point in the operating program may be corrected, and if the amount of correction has an absolute value exceeding the particular threshold, a warning may be displayed on the display unit.

In the aspect described above, the storage unit may store, for each operating program, the kinematic parameter at the time the operating program is generated.

In the aspect described above, the storage unit may store, for each teaching point of the operating program, the kinematic parameter at the time of teaching.

In the aspect described above, when the kinematic parameter is updated, the kinematic parameter before updating may be stored in the storage unit.

Another aspect of the present invention provides a robot control method with which, when a kinematic parameter used in a formula representing a relationship between displacement of each drive axis of a robot and a position and an orientation of a leading end of the robot is updated after teaching of an operating program, the position and orientation of the leading end of the robot at the time of teaching are still realized by executing the operating program using the present kinematic parameter to operate the drive axis, the method including a step of storing the kinematic parameter before updating and a step of correcting position data of at least one teaching point in the operating program based on the kinematic parameter before updating stored in the storage unit and the present kinematic parameter.

The present invention has an advantageous effect in that an operating program for which a teaching operation is carried out before execution of calibration can be re-used without having to perform a re-teaching operation.

The invention claimed is:

1. A robot control apparatus comprising:
a storage unit that stores an operating program and a kinematic parameter used in a formula representing a relationship between displacement of each drive axis of a robot and a position and an orientation of a leading end of the robot; and
a drive unit that operates the drive axis of the robot based on the operating program and the kinematic parameter stored in the storage unit,
wherein, in order for the leading end of the robot to assume a position and an orientation at the time of teaching even when the kinematic parameter has been updated after teaching of the operating program and when the drive axis is operated by executing the operating program using the present kinematic parameter,
the storage unit stores the kinematic parameter before updating,
the drive unit corrects position data of at least one teaching point in the operating program based on the kinematic parameter before updating, stored in the storage unit, and the present kinematic parameter, and
the drive unit corrects position data of at least one teaching point of the operating program taught before updating of the kinematic parameter, the position data being corrected by using a difference between an angle of the drive axis at which the same position and orientation of the leading end of the robot as those at the time of teaching are realized by using the kinematic parameter before updating and an angle of the drive axis at which the same position and orientation of the leading end of the robot as those at the time of teaching are realized by using the present kinematic parameter.

2. The robot control apparatus according to claim 1, wherein the storage unit stores, for each operating program, the kinematic parameter at the time the operating program is generated.

3. The robot control apparatus according to claim 1, wherein the storage unit stores, for each teaching point of the operating program, the kinematic parameter at the time of teaching.

4. The robot control apparatus according to claim 1, wherein when the kinematic parameter is updated, the kinematic parameter before updating is stored in the storage unit.

5. A robot control apparatus comprising:
a display unit,
a storage unit that stores an operating program and a kinematic parameter used in a formula representing a relationship between displacement of each drive axis of a robot and a position and an orientation of a leading end of the robot; and
a drive unit that operates the drive axis of the robot based on the operating program and the kinematic parameter stored in the storage unit,
wherein, in order for the leading end of the robot to assume a position and an orientation at the time of teaching even when the kinematic parameter has been updated after teaching of the operating program and when the drive axis is operated by executing the operating program using the present kinematic parameter,
the storage unit stores the kinematic parameter before updating, and
the drive unit calculates, based on the kinematic parameter before updating, stored in the storage unit, and the present kinematic parameter, as the amount of correction at at least one teaching point of the operating program taught before updating of the kinematic parameter, a difference between an angle of the drive axis at which the same position and orientation of the leading end of the robot as those at the time of teaching are realized by using the kinematic parameter before updating and an angle of the drive axis at which the same position and orientation of the leading end of the robot as those at the time of teaching are realized by using the present kinematic parameter; and if the amount of correction has an absolute value equal to or less than the particular threshold, position data of the at least one teaching point in the operating program is corrected, and if the amount of correction has an absolute value exceeding the particular threshold, a warning is displayed on the display unit.

6. A robot control method with which, when a kinematic parameter used in a formula representing a relationship between displacement of each drive axis of a robot and a position and an orientation of a leading end of the robot is updated after teaching of an operating program, the position and orientation of the leading end of the robot at the time of teaching are still realized by executing the operating program using the present kinematic parameter to operate the drive axis, the method comprising:
a step of storing, by a processor, the kinematic parameter before updating; and
a step of correcting, by the processor, position data of at least one teaching point in the operating program based on the kinematic parameter before updating, stored in the storage unit, and the present kinematic parameter;
wherein the step of correcting position data includes correction of position data of at least one teaching point of the operating program taught before updating of the kinematic parameter, the position data being corrected by using a difference between an angle of the drive axis at which the same position and orientation of the leading end of the robot as those at the time of teaching are realized by using the kinematic parameter before updating and an angle of the drive axis at which the same position and orientation of the leading end of the robot as those at the time of teaching are realized by using the present kinematic parameter.

7. A robot control method with which, when a kinematic parameter used in a formula representing a relationship between displacement of each drive axis of a robot and a position and an orientation of a leading end of the robot is updated after teaching of an operating program, the position and orientation of the leading end of the robot at the time of teaching are still realized by executing the operating program using the present kinematic parameter to operate the drive axis, the method comprising:
 a step of storing, by a processor, the kinematic parameter before updating;
 a step of calculating, by the processor, based on the kinematic parameter before updating, stored in the storage unit, and the present kinematic parameter, as an amount of correction at at least one teaching point of the operating program taught before updating of the kinematic parameter, a difference between an angle of the drive axis at which the same position and orientation of the leading end of the robot as those at the time of teaching are realized by using the kinematic parameter before updating and an angle of the drive axis at which the same position and orientation of the leading end of the robot as those at the time of teaching are realized by using the present kinematic parameter; and if the amount of the correction has an absolute value equal to or less than a particular threshold,
 a step of correcting, by the processor, a position data of the at least one teaching point in the operating program, and a step of warning if the amount of correction has an absolute value exceeding a particular threshold.

\* \* \* \* \*